United States Patent

[11] 3,570,762

| [72] | Inventor | Leon J. Wanson<br>118, Avenue Isidore Gheyskens,<br>Auderghem, Belgium |
|---|---|---|
| [21] | Appl. No. | 817,515 |
| [22] | Filed | Apr. 18, 1969 |
| [45] | Patented | Mar. 16, 1971 |

[54] HEAT TRANSFER FLUID PLANT
7 Claims, 4 Drawing Figs.

[52] U.S. Cl. .................................................. 237/66,
237/56
[51] Int. Cl. .................................................. F24d 3/10

[50] Field of Search .......................................... 237/8, 56, 63

[56] References Cited
UNITED STATES PATENTS

| 2,264,793 | 12/1941 | Griffiths | 237/8 |
| 2,753,120 | 7/1956 | Carlson | 237/8 |

*Primary Examiner*—Edward J. Michael
*Attorney*—Sughrue, Rothwell, Mion, Zinn & MacPeak ABSTRACT: In a heat transfer fluid plant, an expansion vessel is grouped with a deaerator and a damping receiver in a single structure to be located at the highest point of the plant.

3,570,762

HEAT TRANSFER FLUID PLANT

FIELD OF THE INVENTION

The present invention is related to a heat transfer fluid plant and more particularly with the part of such plant that comprises an expansion vessel, a deaerator and a damping receiver.

BACKGROUND OF THE INVENTION

It has already been proposed for avoiding in such plants the hot fluid being brought into contact with atmospheric air, which could result in destroying said fluid, to insert a damping receiver in the conduit leading to the expansion vessel, said damping receiver being connected by its upper part to the circuit of the plant and to the expansion vessel by its lower part. As is well known, heat transfer fluids, such as mineral oils, may be used in such plants and may be heated up to approximately 400° C. without their vapor pressure reaching atmospheric pressure. Such fluids oxidize when in contact with air at temperatures above 100° C., and thus it is important to prevent contact of such fluids with air when they are at elevated temperatures. The expansion vessel is provided to allow the fluid in the plant to expand as required by temperature changes in the conduit system and boiler for the plant.

It has also been proposed to combine the damping receiver and a deaerator within a sole vessel. The deareator is required to remove gases from the fluid in the circuit in order to insure a normal function of the circulating pump for the plant.

In these known plants, only the expansion vessel is located in the upper part of their protecting building. The damping receiver and the deaerator, whether combined or not, are located at a rather lower point. It is necessary in such a case to provide conduits interconnecting enclosed spaces located at different levels. Owing to the different temperatures that are prevailing at different locations of said conduits, the fluid contained therein may be subjected to individual movements determined by the thermosiphon effect and the protective action expected from the damping receiver could be disturbed. On the other hand, the conduit connecting the deaerator to the atmosphere must rise up to the expansion vessel and therefore contains fluid over an appreciable height, said fluid being repelled into the expansion vessel by the action of the gases which tend to rise and discharge.

SUMMARY OF THE INVENTION

The object of the invention is to provide heat transfer fluid plant eliminating the aforementioned drawbacks. This is obtained by grouping the expansion vessel, the deaerator and the damping receiver within a single structure to be located at the highest point of the plant. That structure advantageously comprises particular arrangements designed to provide the most possible effectiveness from its components, especially by maintaining thermal insulation between the different components.

DRAWINGS

The present invention is illustrated by way of example by the following drawings. In these drawings.

DESCRIPTION

Figure 1:
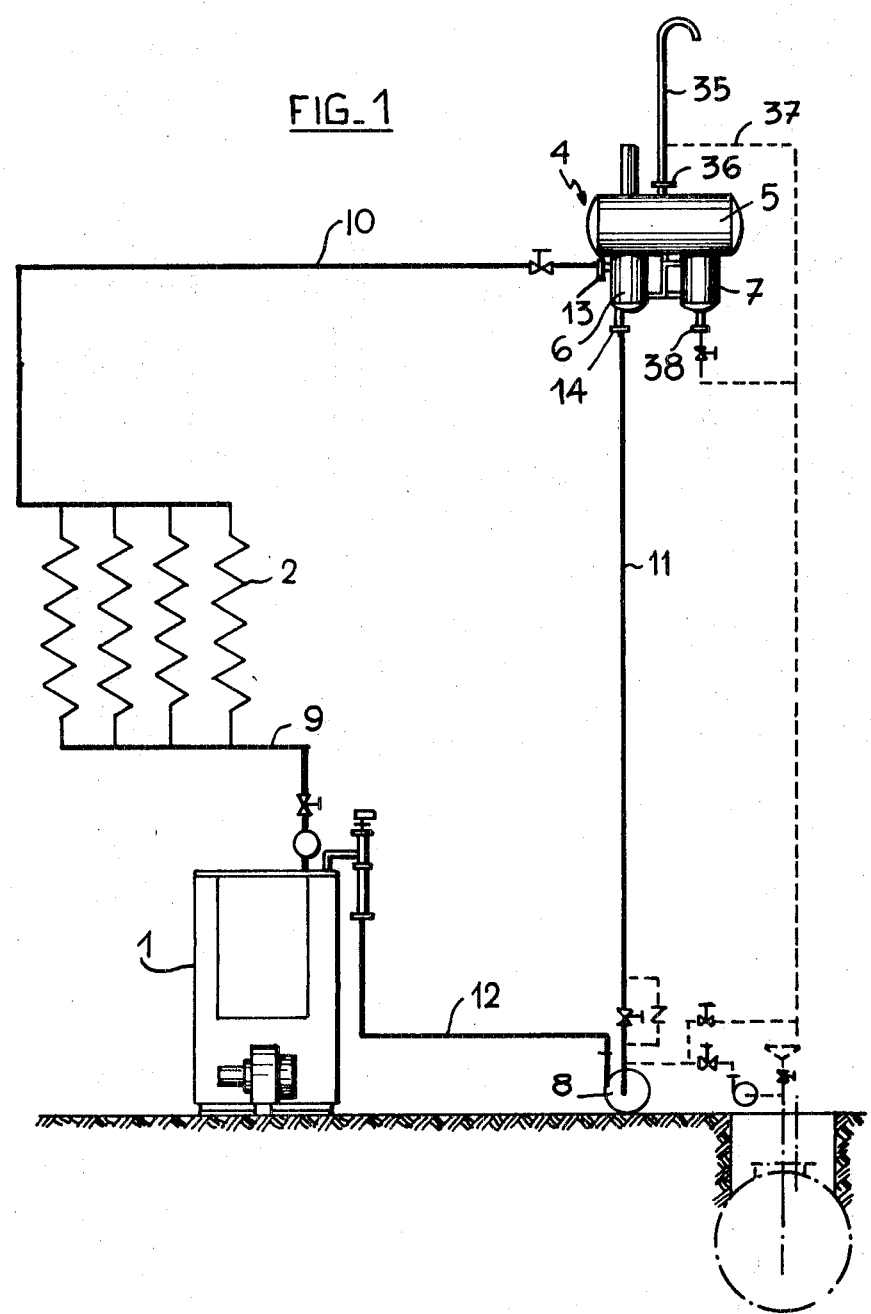
FIG. 1 is a diagrammatic view of the whole plant.

A heat transfer fluid plant comprising a boiler 1, a heat exchanger 2, a structure 4 located at the highest level of the plant and comprising an expansion vessel 5, a deaerator 6, a damping receiver 7 and a circulating pump 8 has thus been diagrammatically represented in FIG. 1, all these components being included into a circuit comprising tubing elements such as 9, 10, 11, 12 and coupling elements such as 13 and 14. The tubing and secondary fittings represented in dotted lines which are not essential as to the understanding of the invention, are not described.

Figure 2:
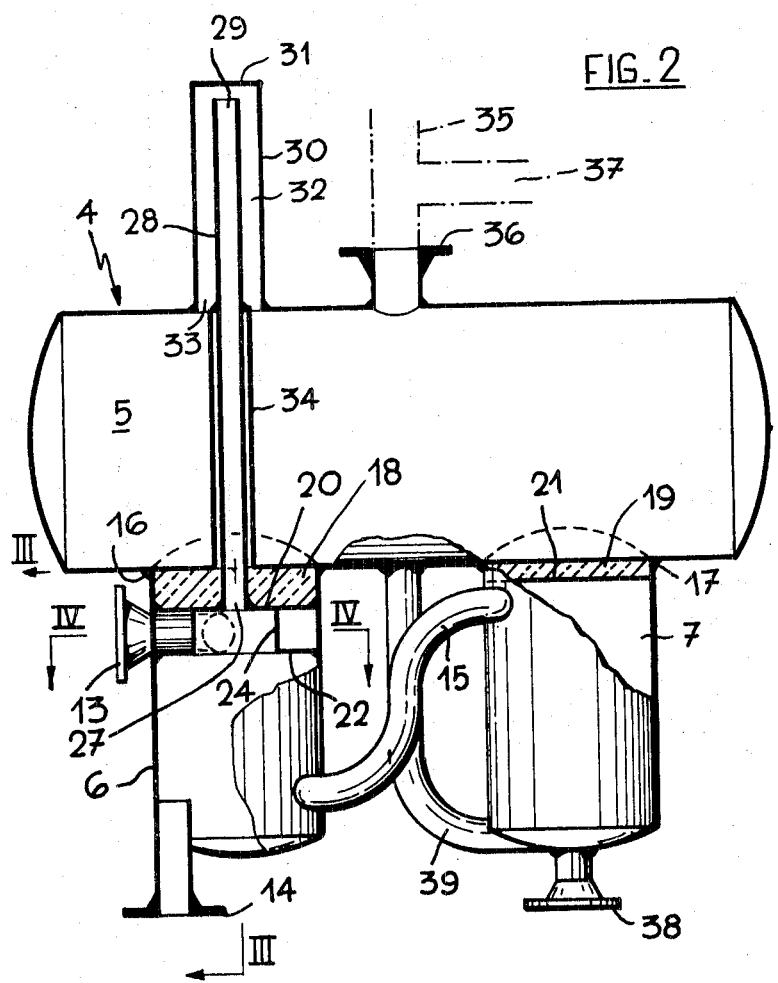
FIG. 2 shows a longitudinal sectional view, wit some parts broken away, of the structure comprising the expansion vessel, deaerator and damping receiver.

The novel and unique part of the plant is the structure 4, the detailed construction of which appears in FIG. 2. The vessels 6 and 7 are welded to the expansion vessel 5 as indicated at 16 and 17. Moreover they are thermally insulated from vessel 5 by means of layers of insulating material 18 and 19 respectively lying on false bottoms 20 and 21.

The deaerator 6, comprised of a vertical cylindrical body, is connected to conduit 11 through coupling element 14, which penetrates into the lower part of the deaerator. A conduit 15 connects the lower part of said deaerator to the upper part of damping receiver 7, that is also cylindrical and vertical, the lower part of which communicates with the lower part of the expansion vessel 5 by means of a conduit 39 according to an arrangement known per se. The deaerator is provided for the purpose of allowing fluid entering it through the conduit 10, in which some gases or vapor may exist, to be deareated or degased completely before reaching the pump 8 through the conduit 11.

Figure 4:
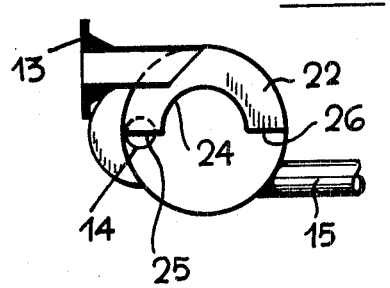
FIG. 4 is a sectional view taken along line IV–IV of FIG. 2.
Figure 3:
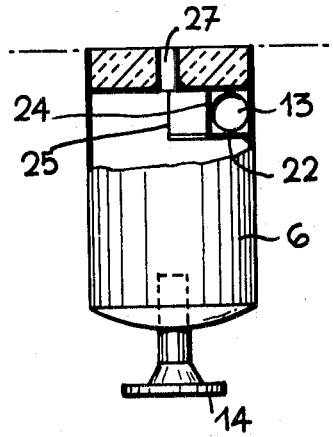
FIG. 3 is a sectional view of the deaerator, taken along line III–III of FIG. 2.

The coupling element 13 connected with the upper conduit 10 from the upper part of heat exchanger 2, tangentially penetrates into the body of the deareator 6 as can best be seen from FIG. 4. It opens into a generally semicircular guiding channel the bottom of which is indicated by 22 and that is limited at its upper part by the edge part of the false bottom 20, said channel being limited to the outside by a part of the sheath of vessel 6 and to the inside by a semicylindrical wall 24. Ends 25 and 26 of the channel open into the upper part of vessel 6. From the center of false bottom 20 which is provided with an aperture 27, a vertical tube passes through vessel 5 and ends in an upper aperture 29. A tube 30 the diameter of which is greater than that of tube 28 and the upper end of which is closed by means of a plate 31 surrounds tube 28 above vessel 5. The annular space 32 that is comprised between tubes 28 and 30 communicates by its lower part 33 with upper part of vessel 5. In the zone where the tube 28 passes through the vessel 5, it is surrounded by a sheath comprised by a coaxial tube 34 which ensures its thermal insulation.

The upper part of expansion vessel 5 communicates with the atmosphere by means of a tube 35 fixed to a coupling element 36 having its free end open. Tube 35 may comprise a lateral overflow branch 37. It will be readily seen, therefore, that gases traveling upwardly through the tube 28 pass downwardly in the annular space 32 defined by the outer tube 30, enter the expansion vessel 5 and are removed therefrom through the tube 35 in communication with the surrounding atmosphere.

The cold fluid in the expansion vessel 5 is thermally insulated from the hot fluid in the deaerator 6 and damping receiver 7 by the insulation layers 18 and 19, respectively, and is thermally insulated from the hot gas in the conduit 28 by the coaxial tube 34. The fluid in the expansion vessel 5, therefore, is maintained at a relatively low temperature below that at which the fluid will oxidize in the presence of atmospheric air. The damping receiver 7 also serves to prevent relatively cool fluid in the expansion vessel 5 from being heated by the hot fluid in the deaerator 6. As shown in FIG. 2, the hot fluid from the deaerator vessel 6 is conveyed by the conduit 15 to the upper end of the damping receiver 7 which is thermally insulated by the insulation layer 19 from the expansion vessel 5. The relatively cool fluid in the expansion vessel 5 is conveyed by the conduit 39 to the lower end of the damping receiver 7. In the damping receiver 7, therefore, the hot fluid tends to remain in the upper portion thereof while the cold fluid remains in the bottom portion thereof. Should the fluid expand in the fluid plant, owing to an increase in temperature, some cold fluid will remain in the bottom of the damping receiver 7. Should the fluid contract in the plant, owing to a drop in temperature, some hot fluid will remain in the upper portion of the receiver 7 in order to prevent the cold fluid from reaching to the conduit 15.

Coupling element 38 that can be seen at the lower part of damping receiver 7 is normally closed by a valve that can be opened for draining operations.

The advantages of the plant according to the present invention are obvious. The deaeration occurs at the most elevated location. The connecting tubing between expansion vessel, deaerator ad damping receiver is as short as possible. The thermal insulation between components is ensured. The particular type of construction of the deaerator allows same to operate by centrifugal action, thereby utilizing dynamically the differences in specific gravity existing between fluids, i.e. the gases having the lowest density are evacuated through the central aperture 27. The vapors that are not miscible with heat transfer fluid will condense at the surface of the cold fluid contained in vessel 5. That condensate shall be allowed to escape subsequently through coupling element 38.

It should be noted that oxidation of a hot part of the heat transfer fluid will not occur at any location of the plant since said fluid is cold in the sole zone (vessel 5) where it is in contact with the atmosphere. In this manner, the deterioration of the fluid owing to oxidation at high temperatures (over 100° C. in the case of mineral oils) is effectively prevented. Finally, the connections are simple and few in number, which avoids mismounting the plant.

I claim:

1. In a heat transfer fluid plant wherein the fluid used is of such nature that contacting of the fluid when hot with air would be detrimental to the fluid, and the presence of gases in the fluid would be detrimental to the general operation of the plant, said plant comprising a boiler means, at least one heat exchanger means, an expansion vessel means, a deaerator means, a damping receiver means, and conduit means connecting said boiler, heat exchanger, expansion vessel, deaerator and damping receiver means to form a fluid circuit; the improvement wherein said deaerator means and said damping receiver means are thermally insulated from and connected to said expansion vessel to form a unitary structure, and said structure is positioned at the highest point of said plant.

2. The heat transfer fluid plant of claim 1 wherein said deaerator means is in communication with the upper portion of said expansion vessel means and said damping receiver means, and said damping receiver means is in communication with the lower end of said expansion vessel means.

3. Heat transfer fluid plant comprising a boiler means, at least one heat exchanger means, a unitary structure located at the highest level of the plant, and first conduit means for connecting said boiler means, said heat exchanger means, and said unitary structure means, said structure means comprising an elongated expansion vessel extending substantially horizontally, a substantially vertically extending deareator vessel secured to the bottom of said expansion vessel, and a substantially vertically extending damping receiver vessel secured to the bottom of said expansion vessel, the upper portion of said expansion vessel being formed with a passage means open to the surrounding atmosphere, the lower portion of said deareator vessel being formed with a first coupling element connected to said first conduit means, second conduit means connecting to the lower portion of said deareator vessel to the upper portion of said damping receiver vessel, the upper portion of said deareator vessel comprising a second coupling element which substantially tangentially penetrates into said deareator vessel and is adapted to be connected to said first conduit means, the upper portion of said deareator vessel being in communication with the upper portion of said expansion vessel, and third conduit means connecting the lower portion of said damping receiver vessel to the lower portion of the expansion vessel.

4. The heat transfer fluid plant of claim 3 wherein said deaerator vessel and said damping receiver vessel are thermally insulated from said expansion vessel.

5. The heat transfer fluid plant of claim 3 wherein said expansion, deaerator and damping receiver vessels are formed of metal, and said deareator and damping receiver vessels are welded to the exterior of said expansion vessel, the inner space of said deaerator vessel and the inner space of said damping receiver vessel being respectively separated from the exterior of said expansion vessel by a mattress of thermally insulating material.

6. The heat transfer fluid plant of claim 3 wherein said deaerator vessel is of a substantially cylindrical shape, said second coupling element penetrates into said deaerator vessel transversely to the longitudinal axis thereof and extends substantially tangentially to the inside wall of said deaerator vessel, and the communication between the upper portion of said deaerator vessel and the upper portion of said expansion vessel is established by a first tube extending upwardly from said deaerator vessel and passing through said expansion vessel, and wherein a second tube closed at its upper end is mounted on the upper portion of the expansion vessel and is in communication with the interior of said expansion vessel, said first tube extending upwardly into said second tube and terminating in an open upper end spaced from the closed end of said second tube.

7. A heat transfer fluid plant according to claim 6 wherein the portion of said first tube extending through said expansion vessel is surrounded by insulating means.